(12) United States Patent
Heyraud

(10) Patent No.: US 6,857,827 B2
(45) Date of Patent: Feb. 22, 2005

(54) SPINDLE FOR MACHINING ACCURATE INNER GROOVES

(75) Inventor: George Heyraud, Rueil Malmaison (FR)

(73) Assignee: Hispano Suiza, Colombes (FR)

(*) Notice: Subject to any disclaimer, the term of this patent is extended or adjusted under 35 U.S.C. 154(b) by 92 days.

(21) Appl. No.: 10/182,721

(22) PCT Filed: Aug. 30, 2001

(86) PCT No.: PCT/FR01/02694

§ 371 (c)(1),
(2), (4) Date: Aug. 9, 2002

(87) PCT Pub. No.: WO02/18084

PCT Pub. Date: Mar. 7, 2002

(65) Prior Publication Data

US 2003/0012610 A1 Jan. 16, 2003

(30) Foreign Application Priority Data

Aug. 31, 2000 (FR) .............................. 00 11102

(51) Int. Cl.[7] .................................................. B23P 15/42
(52) U.S. Cl. ............................ 407/13; 407/18; 409/259
(58) Field of Search ............................ 407/16, 18, 19, 407/13; 409/259

(56) References Cited

U.S. PATENT DOCUMENTS

| 1,197,132 | A | * | 9/1916 | Lapointe | 407/16 |
| 3,178,800 | A | * | 4/1965 | Psenka | 407/16 |
| 3,217,383 | A | * | 11/1965 | Psenka | 407/18 |
| 3,231,962 | A | * | 2/1966 | Psenka | 407/18 |
| 4,462,723 | A | * | 7/1984 | Walter et al. | 407/18 |
| 5,224,804 | A | | 7/1993 | Shepley | |
| 5,435,676 | A | * | 7/1995 | Yera et al. | 409/244 |
| 5,503,506 | A | * | 4/1996 | Yuan | 407/13 |
| 5,865,569 | A | * | 2/1999 | Holstein et al. | 407/13 |

FOREIGN PATENT DOCUMENTS

GB          332 168          7/1930

* cited by examiner

Primary Examiner—A. L. Wellington
Assistant Examiner—Dana Ross
(74) Attorney, Agent, or Firm—Oblon, Spivak, McClelland, Maier & Neustadt, P.C.

(57) ABSTRACT

A spindle for machining inner grooves and including a cylindrical input guide of diameter D1 and a cutting portion. In the spindle the cutting portion is subdivided into a plurality of cutting sections separated by realigning guides having a diameter equal to diameter D1 of the input guide to accurately center the grooves relative to the hole previously machined in the workpiece.

28 Claims, 1 Drawing Sheet

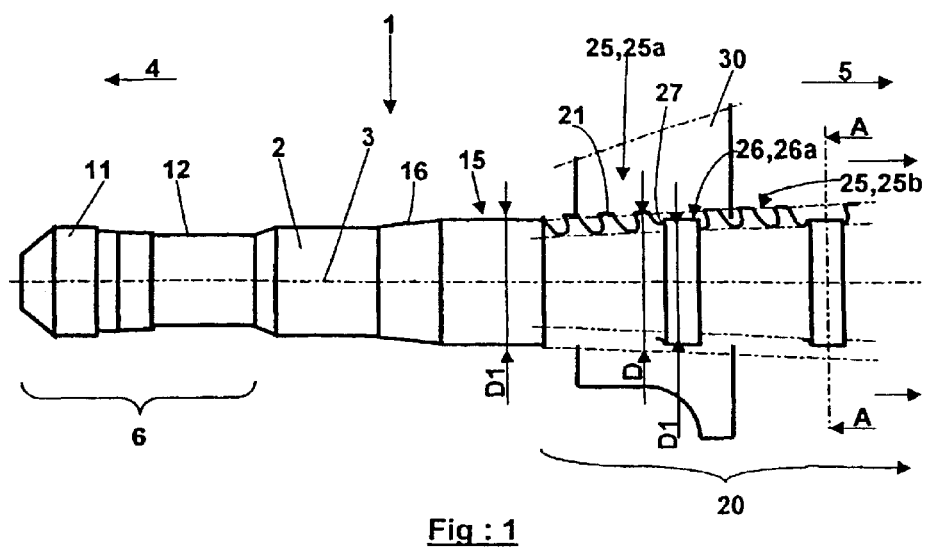
Fig: 1
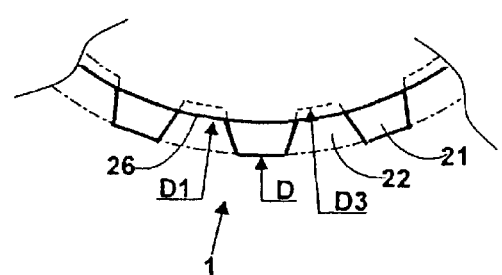
Fig: 2

SPINDLE FOR MACHINING ACCURATE INNER GROOVES

DESCRIPTION

The invention relates to machine tools which remove material and more particularly to broaches for machining internal splines.

Broaches for machining internal splines are tools which are well known. Made of cutting tool material, for example of tungsten carbide, they comprise, in succession, from front to rear, a cylindrical inlet guide of diameter D1 followed by a cutting section consisting of a number of cutting teeth the diameter of which increases progressively from the diameter D1 of the inlet guide. The teeth themselves comprise slots so as to reproduce the profile of the internal splines that are to be machined. The workpiece is pierced beforehand, along the axis of the splines that are to be machined, with a reference bore of diameter D1, increased by a functional clearance E allowing the inlet guide to slide in the reference bore. This reference bore constitutes the reference with respect to which the splines that are to be machined need to be centered. The splines are machined by the passage of the broach through the reference bore in a back and forth movement. The broach is, to begin with, centered in the reference bore by the inlet guide. However, when the inlet guide has left the reference bore, the broach is likely to deflect radially as the splines are machined, which means that the machined splines are no longer exactly centered on the reference bore.

To overcome that, it is known practice for two or three stages of unslotted teeth to be arranged behind the teeth for machining the splines, so as to allow the reference bore to be touched up and recentered with respect to the finished splines. The disadvantage of such a solution is that it does not allow the machined splines to be centered rigorously with respect to the reference bore already machined in the workpiece.

U.S. Pat. No. 5,224,804 discloses a broach for boring crankshaft bearing mounts on a combustion engine, this broach comprising a succession of cutting portions of diameters which increase from front to rear, these cutting portions being separated by "pilot segments" at the diameter of the cutting portions preceding them. A broach such as this makes it possible to improve the mutual concentricity of the bearing mounts but does not allow these bearing mounts to be positioned rigorously in the space of these bearing mounts, because random drift, arising out of the necessary clearance left between the pilot segments and the bores made by the preceding cutting portions, builds up. Thus, the greater the amount of material removed by the broaching operation, the more cutting portions are needed and the greater the resulting drift becomes. There are two reasons why this necessary clearance is not insignificant:

1. It has always to exist so that the pilot segments can slide without forcing in the bores,
2. it has to be large so that this clearance still actually exists when the cutting edges of the broach begin to wear.

The invention proposes a broach for internal splines that allows the machined splines to be centered rigorously with respect to the reference bore. Such a broach is notable in that the cutting section is subdivided from front to rear by a number of cutting portions separated from one another by cylindrical recentering guides of the same diameter D1 as the inlet guide. In other words, two contiguous cutting portions are separated from one another by at least one recentering guide, and preferably by just one. The recentering guides allow the broach to be recentered on the reference bore while the splines are being machined and thus make it possible to ensure rigorous centering of the machined splines with respect to the reference bore.

The broach of the invention cannot be likened to the one disclosed in U.S. Pat. No. 5,224,804 because according to the invention, the recentering guides slide along the reference bore during the broaching operation. As a result, the drift is at most equal to the necessary clearance left between the reference bore and the recentering guides. There is therefore no build-up of drift as there was in the aforementioned patent, and the positioning of the broached surfaces, in this instance the splines, in space, is far better.

The invention will be better understood, and the advantages it affords will become more clearly apparent from a detailed exemplary embodiment of the broach and from the attached figures.

FIG. 1 illustrates a broach according to the invention.

FIG. 2 illustrates the broach of FIG. 1 in cross section.

A conventional broach will first of all be described, and reference will firstly be made to FIG. 1. The broach 1 consists of a straight rod 2 of geometric axis 3. The broach 1 is made of cutting tool material, for example tungsten carbide. The front 4 and the rear 5 of the broach 1 will be defined. At the front 4, the broach 1 comprises attachment means 10 allowing the broach 1 to be grasped and pulled from rear 5 to front 4. These attachment means 10 comprise, from front 4 to rear 5, a bulb 11 and a groove 12 allowing the broach 1 to be grasped via the bulb 11 by a gripper, not depicted. The broach 1 then comprises, toward the rear 4, an inlet guide 15 preceded by a chamfer 16, the inlet guide 15 being cylindrical of diameter D1 centered on the geometric axis 3. The inlet guide 15 is followed immediately toward the rear 5 by a cutting section 20 consisting of a number of teeth 21 which are cutting forward 4, the diameter D of which increases progressively from front 4 to rear 5 from a value equal to the diameter D1 of the inlet guide (15) to a diameter D2, not depicted, corresponding to the outside diameter of these splines that are to be machined.

Reference will be made provisionally to FIG. 2. The teeth 21 are laterally separated by slots 22 penetrating the broach 1 radially toward the geometric axis 3 down to a diameter D3 at most equal to the diameter D1 of the inlet guide 15 and preferably smaller than it. The term "laterally" is to be understood as meaning along the circumference of the broach 1 passing through the teeth 21. It will be appreciated that the flanks of the slots 22 have a shape that complements the flanks of the splines, not depicted, that are to be machined. The teeth 21 may be arranged along circumferences of the broach 1. Most often, they are arranged in a single helix so as to give a constant cutting force.

Reference is made once again to FIG. 1. According to the invention, the cutting section 20 is divided from front 4 to rear 5 into a number of cutting portions 25 separated one from the next by a recentering guide 26. The cutting portions 25 obviously consist of the previously defined teeth 21. The recentering guides 25 are cylindrical of diameter equal to the diameter D1 of the inlet guide, these recentering guides also being centered on the geometric axis 3. The recentering guides 26 each have a chamfer 27 at the front 4 each.

The way in which the broach 1 works is as follows: the workpiece 30 is already pierced with a bore, unreferenced, of diameter D1 increased by a functional clearance E allowing the inlet guide 15 and the recentering guides 26 to slide.

The broach is introduced into the reference bore in the workpiece 30 and pulled from rear 5 to front 4. The inlet guide 15 enters the workpiece 30 first and centers the broach 1. While the teeth 21 of the first cutting portion 25a enter the workpiece 30 and begin to machine the splines, the inlet guide 15 leaves the workpiece 30 and is no longer able to center the broach 1. As a result, the teeth 21 are therefore likely to deviate radially, but this deviation is very soon halted by the arrival of the first recentering guide 26a which then recenters the broach 1 on the reference bore already pierced in the workpiece 30. The first recentering guide 26a successively centers the teeth 21 of the first cutting portion 25 then of the second cutting portion 25b and so on and so forth as the broach 1 advances through the workpiece 30. It will be appreciated that the chamfers 27 return the recentering guides 26 to face the reference bore in the event of deviation and thus make it easier for the recentering guides 26 to enter the reference bore. The length of the recentering guides 26 is not critical. It will preferably be at most equal to one quarter of the diameter D1 so as to have a good distribution of the pressures exerted by the recentering guides 26 on the reference bore.

In order not to increase the length of the broach 1 excessively, each cutting portion 25 will comprise axially, that is to say from front 4 to rear 5, at least three teeth 21. In general, however, it is preferable not to have more than six teeth 21 per cutting portion 25, so as not to allow an excessive amount of deviation of the broach 1 to develop, as it might not be possible for this to be compensated for by the next recentering guide 26 without developing an excessive force that would run the risk of breaking the broach 1 or the workpiece 30.

The invention is not restricted to the exemplary embodiment thereof which has just been given but also covers all alternative forms supported by the claims.

The broach will usually have a circular profile centered on the geometric axis 3, but the invention also applies to non-circular profiles. In any event, the cross section of the recentering guides 26 will be identical to that of the inlet guide 15.

The attachment means 6 are usually at the front 4 of the broach 1, but the invention may just as easily be applied to a broach comprising attachment means at the rear 5 or combined ones at the front 4 and the rear 5, these last two configurations making it possible to eliminate or reduce the tensile load imposed on the broach 1.

The cutting section 20 may also be supplemented toward the rear 5 by several stages of teeth, not depicted, these teeth having no slots and allowing the reference bore to be finished after the recentering guides have passed through and rubbed against it.

What is claimed is:

1. A broach for machining precision internal splines, the broach having an overall form of a straight rod of geometric axis made of cutting tool material, the broach comprising:
attachment means and, in succession, from front to rear, an inlet guide followed by a cutting section, the inlet guide being cylindrical of diameter D1 and centered on the geometric axis,
the cutting section comprising a predetermined number of cutting teeth centered on the geometric axis and facing forward, the cutting teeth having an outside diameter D at least equal to D1 and increasing progressively from front to rear, the cutting teeth being laterally separated by slots penetrating into the broach down to a diameter D3 at most equal to the diameter D1 of the inlet guide, the cutting section being subdivided from front to rear into a number of cutting portions separated from one another by recentering guides, the cutting portions comprising the cutting teeth, the recentering guides being cylindrical, wherein the recentering guides have a diameter equal to the diameter D1 of the inlet guide.

2. The broach as claimed in claim 1, wherein the recentering guides each have a chamfer of the front.

3. The broach as claimed in claim 1, wherein the cutting portions each axially comprise at least three teeth.

4. The broach as claimed in claim 2, wherein the cutting portions each axially comprise at least three teeth.

5. The broach as claimed in claim 1, wherein the cutting portions each axially comprise six rows of teeth at most.

6. The broach as claimed in claim 2, wherein the cutting portions each axially comprise six rows of teeth at most.

7. The broach as claimed in claim 3, wherein the cutting portions each axially comprise six rows of teeth at most.

8. The broach as claimed in claim 4, wherein the cutting portions each axially comprise six rows of teeth at most.

9. A machine tool comprising from front to rear:
an inlet guide of outside diameter D1;
a first cutting portion comprising a first plurality of cutting teeth having an outside diameter at least equal to D1;
a first recentering guide having a cylindrical portion of diameter equal to the diameter D1 of the inlet guide; and
a second cutting portion comprising a second plurality of cutting teeth having an outside diameter at least equal to D1.

10. The machine tool according to claim 9, wherein the inlet guide, said first and second cutting portions and said first recentering guide are aligned along a geometric axis.

11. The machine tool according to claim 9, wherein the inlet guide, said first and second cutting portions and said first recentering guide are made of cutting tool material.

12. The machine tool according to claim 9, further comprising an attachment portion between said front and said inlet guide.

13. The machine tool according to claim 9, wherein said inlet guide is cylindrical.

14. The machine tool according to claim 10, wherein said inlet guide is centered on said geometric axis.

15. The machine tool according to claim 10, wherein said cutting teeth of said first and second cutting portions are centered on said geometric axis.

16. The machine tool according to claim 15, wherein said cutting teeth of said first and second cutting portions face toward said front.

17. The machine tool according to claim 16, wherein said cutting teeth of said first and second cutting portions have an outside diameter increasing progressively from said front to said rear.

18. The machine tool according to claim 17, wherein said cutting teeth of said first and second cutting portions are laterally separated by slots.

19. The machine tool according to claim 18, wherein said slots have a diameter at most equal to the diameter D1 of the inlet guide.

20. The machine tool according to claim 9, further comprising:
a second recentering guide between said second cutting portion and said rear, said second recentering guide having a cylindrical portion of diameter equal to the diameter D1 of the inlet guide; and
a third cutting portion between said second recentering guide and said rear, said third cutting portion comprising a third plurality of cutting teeth having an outside diameter at least equal to D1.

21. The machine tool according to claim 10, wherein said cylindrical portion of said first recentering guide is centered on said geometric axis.

22. The machine tool according to claim 9, wherein said first recentering guide comprises a chamfer between said cylindrical portion and said front.

23. The machine tool according to claim 9, wherein each of said first and second cutting portions axially comprises at least three of said cutting teeth.

24. The machine tool according to claim 9, wherein said first recentering guide has a length at most equal to a quarter of the diameter D1 of the inlet guide.

25. The machine tool according to claim 9, wherein said first recentering guide has a cross-section which is identical to that of said inlet guide.

26. The machine tool according to claim 9, further comprising a first attachment portion between said front and said inlet guide.

27. The machine tool according to claim 26, further comprising a second attachment portion between said rear and said second cutting portion.

28. A broach for machining a workpiece, comprising from front to rear:
- means for centering said broach within a reference bore in said workpiece;
- first cutting means for cutting through said workpiece after said broach is centered by said means for centering;
- means for recentering said broach after said first cutting means has cut through said workpiece; and
- second cutting means for cutting through said workpiece after said broach is recentered by said means for recentering,
- wherein each of said means for centering and said means for recentering has a cylindrical portion having a same outer diameter.

* * * * *